(12) United States Patent
Tan et al.

(10) Patent No.: US 10,352,298 B2
(45) Date of Patent: Jul. 16, 2019

(54) WIND GENERATION SYSTEM AND CONTROLLING METHOD THEREOF

(71) Applicant: GENERAL ELECTRIC COMPANY, Schenectady, NY (US)

(72) Inventors: Zhuohui Tan, Shanghai (CN); Robert Gregory Wagoner, Salem, VA (US); Anthony Michael Klodowski, Salem, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/386,431

(22) Filed: Dec. 21, 2016

(65) Prior Publication Data

US 2018/0171976 A1    Jun. 21, 2018

(51) Int. Cl.
  *F03D 7/02*    (2006.01)
  *H02K 7/18*    (2006.01)
  *H02P 9/00*    (2006.01)

(52) U.S. Cl.
  CPC ......... *F03D 7/0272* (2013.01); *F03D 7/0276* (2013.01); *H02K 7/183* (2013.01);
  (Continued)

(58) Field of Classification Search
  CPC ........ F03D 7/0272; F03D 9/255; H02S 10/12; H02K 7/183; H02P 9/007
  (Continued)

(56) References Cited

U.S. PATENT DOCUMENTS

| | | | |
|---|---|---|---|
| 5,798,631 A | * | 8/1998 | Spee ............... F03D 7/0272 290/31 |
| 6,900,998 B2 | | 5/2005 | Erickson et al. |

(Continued)

FOREIGN PATENT DOCUMENTS

| | | |
|---|---|---|
| CN | 1410669 A | 4/2003 |
| CN | 102155356 A | 8/2011 |

(Continued)

OTHER PUBLICATIONS

Nagel, A., et al., "Robustness Requirements on Semiconductors for High Power Applications," IEEE 15th European Conference on Power Electronics and Applications, pp. 1-9 (2013).

(Continued)

*Primary Examiner* — Charles Reid, Jr.
(74) *Attorney, Agent, or Firm* — GE Global Patent Operation; Douglas D. Zhang

(57) ABSTRACT

A wind generation system includes a wind turbine for generating mechanical power, a doubly-fed induction generator for converting the mechanical power to electrical power, a converter for converting the electrical power to a desired electrical power for supplying to a power grid, and a transformer through which a stator of the generator is coupled to the power grid. When a measured rotation speed feedback from the rotor of the generator is lower than an original cut-in rotation speed of the rotor, a cut-in rotation speed of the rotor is lowered by determining a DC link voltage margin of the converter, determining a DC link voltage setpoint of the converter based on the determined DC link voltage margin; and controlling the converter based on the determined DC link voltage setpoint; and/or by increasing a turn ratio of the transformer to reduce a grid voltage from the power grid.

16 Claims, 8 Drawing Sheets

(52) U.S. Cl.
CPC ........ *H02P 9/007* (2013.01); *F05B 2270/327* (2013.01); *Y02E 10/723* (2013.01); *Y02E 10/725* (2013.01)

(58) Field of Classification Search
USPC ...................................................... 290/44, 55
See application file for complete search history.

(56) References Cited

U.S. PATENT DOCUMENTS

| | | | |
|---|---|---|---|
| 8,774,949 | B2 | 7/2014 | Ou |
| 8,830,705 | B2 | 9/2014 | Jeffrey et al. |
| 9,447,772 | B2* | 9/2016 | Edenfeld ................ H02J 3/386 |
| 9,617,976 | B2* | 4/2017 | Edenfeld ............... F03D 7/0272 |
| 9,680,306 | B2* | 6/2017 | Xue ........................ H02J 3/386 |
| 9,745,957 | B2* | 8/2017 | Seymour ................ F03D 7/026 |
| 2008/0150285 | A1 | 6/2008 | Corcelles Pereira et al. |
| 2010/0166556 | A1* | 7/2010 | Kirtley ..................... F03D 1/06 416/179 |
| 2013/0056986 | A1 | 3/2013 | Jeong et al. |
| 2013/0134711 | A1* | 5/2013 | Spruce ................ F03D 7/0224 290/44 |
| 2014/0361540 | A1 | 12/2014 | Knight |
| 2015/0137520 | A1* | 5/2015 | Garcia ................. H02J 3/1885 290/44 |
| 2015/0233348 | A1* | 8/2015 | Hiremath ................. F03D 7/02 416/1 |
| 2015/0267686 | A1* | 9/2015 | Kjær .................... F03D 7/0224 290/44 |

FOREIGN PATENT DOCUMENTS

| | | |
|---|---|---|
| CN | 103573551 A | 2/2014 |
| EP | 2 436 920 A1 | 4/2012 |
| JP | 2003-088190 A | 3/2003 |
| JP | 2007-195315 A | 8/2007 |
| WO | 2007/003183 A1 | 1/2007 |
| WO | 2013183892 A1 | 12/2013 |

OTHER PUBLICATIONS

Partial European Search Report and Opinion issued in connection with corresponding EP Application No. 16205381.3 dated Jun. 29, 2017.

Extended European Search Report and Opinion issued in connection with corresponding EP Application No. 16205381.3 dated Oct. 12, 2017.

Aziz, et al., "A Simulation Study on Airfoils Using VAWT Design for Low Wind Speed Application", Engineering Technology and Technopreneuship (ICE2T), 2014 4th International Conference, Kuala Lumpur, pp. 105-109, Aug. 27-29, 2014.

Machine Translation and First Office Action and Search issued in connection with corresponding CN Application No. 201510977006.9 dated Sep. 4, 2018.

* cited by examiner

WIND GENERATION SYSTEM AND CONTROLLING METHOD THEREOF

BACKGROUND

This disclosure relates generally to the field of wind power generation, and more particularly to a wind generation system and a method for controlling the wind generation system.

With increasing shortage of global energy resources and increasing environmental pollution, clean and renewable energy resources, especially wind energy sources, have been rapidly developing. Wind turbines have gained attention in this regard.

It is known that operation of a wind turbine depends on the wind speed. For example, wind turbines have predetermined wind speed threshold values for determining operational conditions of a wind generation system. One such threshold value is a cut-in wind speed which is defined as the wind speed where the wind generation system starts to generate power. Another threshold value is a cut-out wind speed which is defined as the highest wind speed during which the wind turbine may be operated while delivering power. Normally, generating power is stopped at wind speeds higher than the cut-out wind speed.

Based on IEC (International Electro-technical Commission) standard, the wind zone is divided into four classes: class I (in which the average wind speed is in the range of 8.5 m/s to 10 m/s), class II (in which the average wind speed is in the range of 7.5 m/s to 8.5 m/s), class III (in which the average wind speed is in the range of 6.0 m/s to 7.5 m/s) and class IV (in which the average wind speed is lower than 6.0 m/s). In the past, most technical development has been in the medium and high wind.

BRIEF DESCRIPTION

It would be useful to have a system and method for controlling wind generation systems when operating in the lower wind zones.

In one embodiment, the present disclosure provides a method for controlling a wind generation system. The wind generation system comprises a wind turbine for generating mechanical power, a doubly-fed induction generator for converting the mechanical power to electrical power, and a converter for converting the electrical power to a desired electrical power for supplying to a power grid. The method comprises determining a DC link voltage margin of the converter when a measured rotation speed feedback from a rotor of the generator is lower than an original cut-in rotation speed of the rotor, wherein the original cut-in rotation speed of the rotor comprises a default lower threshold speed for generating power from the wind turbine; determining a DC link voltage setpoint of the converter based on the determined DC link voltage margin; and controlling the converter based on the determined DC link voltage setpoint so as to lower a cut-in rotation speed of the rotor.

In another embodiment, the present disclosure provides a method for controlling a wind generation system. The wind generation system comprises a wind turbine for generating mechanical power, a doubly-fed induction generator for converting the mechanical power to electrical power, a converter for converting the electrical power to a desired electrical power for supplying to a power grid, and an on-load tap-changing transformer through which a stator of the generator is coupled to the power grid. The method comprises increasing a turn ratio of the on-load tap-changing transformer to reduce a grid voltage from the power grid so as to lower a cut-in rotation speed of the rotor when a measured rotation speed feedback from a rotor of the generator is lower than an original cut-in rotation speed of the rotor. The turn ratio of the on-load tap-changing transformer is defined as a turn ratio of a primary winding to a secondary winding of the transformer. The original cut-in rotation speed of the rotor comprises a default lower threshold speed for generating power from the wind turbine.

In still another embodiment, the present disclosure provides a wind generation system. The wind generation system comprises a wind turbine for generating mechanical power, a doubly-fed induction generator for converting the mechanical power to electrical power, a converter for converting the electrical power to a desired electrical power for supplying to a power grid, and a controller. The controller is configured for determining a DC link voltage margin of the converter when a measured rotation speed feedback from the rotor of the generator is lower than an original cut-in rotation speed of the rotor which comprises a default lower threshold speed for generating power from the wind turbine; determining a DC link voltage setpoint of the converter based on the determined DC link voltage margin; and controlling the converter based on the determined DC link voltage setpoint so as to lower a cut-in rotation speed of the rotor.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", "third" and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. In addition, the terms "connected" and "coupled" are not restricted to physical or mechanical connections or couplings, and can include electrical connections or couplings, whether direct or indirect.

Figure 1:
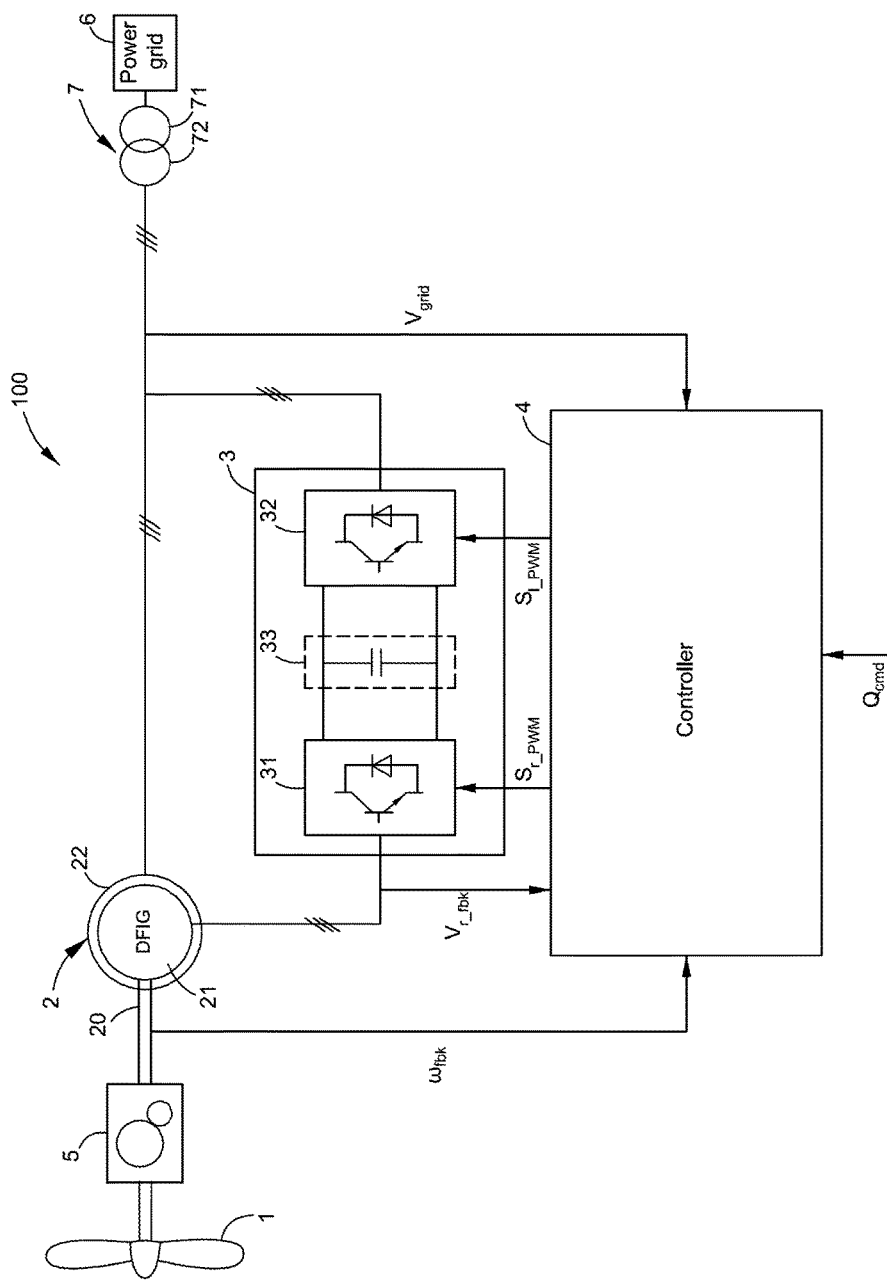
FIG. 1 is a schematic diagram of an exemplary wind generation system in accordance with an embodiment of the present disclosure.

FIG. 1 illustrates a schematic diagram of an exemplary wind generation system in accordance with an embodiment of the present disclosure. As shown in FIG. 1, the exemplary wind generation system 100 may comprise a wind turbine 1, a doubly-fed induction generator (DFIG) 2, a converter 3 and a controller 4. The wind turbine 1 receives wind energy and generates mechanical power. In some embodiments, the wind generation system 100 may further include a gearbox 5 between the wind turbine 1 and the DFIG 2. The gearbox 5 may transmit the mechanical power into a more suitable mechanical force to drive a rotor shaft 20.

The DFIG 2 may convert the mechanical power into electrical power, and include a rotor 21 and a stator 22. The rotor 21 of the DFIG 2 may be coupled to the rotor shaft 20 and may be rotated by the mechanical force via the rotor shaft 20. The stator 22 of the DFIG 2 may be magnetically coupled to the rotor 21, and may be coupled to a power grid 6 through a transformer 7.

The converter 3 is configured to convert the electrical power to a desired electrical power for supplying to the power grid 6, and may include a rotor-side converter 31, a line-side converter 32 and a DC (Direct Current) link 33 for connecting the rotor-side converter 31 and the line-side converter 32. The rotor-side converter 31 may include an AC-DC converter and is configured to convert an AC (Alternating Current) voltage from the rotor 21 of the DFIG 2 into a DC link voltage on the DC link 33. The DC link 33 may include one or more capacitors coupled either in series or in parallel for maintaining the DC link voltage at a certain level, and thus the electrical power from the DC link 33 to the power grid 6 can be managed. The line-side converter 32 may include a DC-AC inverter and is configured to convert the DC link voltage on the DC link 33 to an AC voltage with suitable frequency, phase, and magnitude for feeding to the power grid 6.

The transformer 7 is configured to provide voltage or current transformation of the power from the converter 3 and the power from the stator 22 of the DFIG 2, and provide isolation between the converter 3 and the power grid 6 and between the DFIG 2 and the power grid 6. The transformer 7 is configured to step up the magnitude of the AC voltages output from the line-side converter 31 and the stator 22 of the DFIG 2 to match the power grid 6. The transformer 7 may include a primary winding 71 connected to the power grid 6 and a secondary winding 72 connecting with the stator 22 and the line-side converter 32. In an optional embodiment, the transformer 7 may be an on-load tap-changing transformer. A turn ratio of the on-load tap-changing transformer 7, which is defined as a turn ratio of the primary winding 71 to the secondary winding 72, may be changed.

Figure 2:
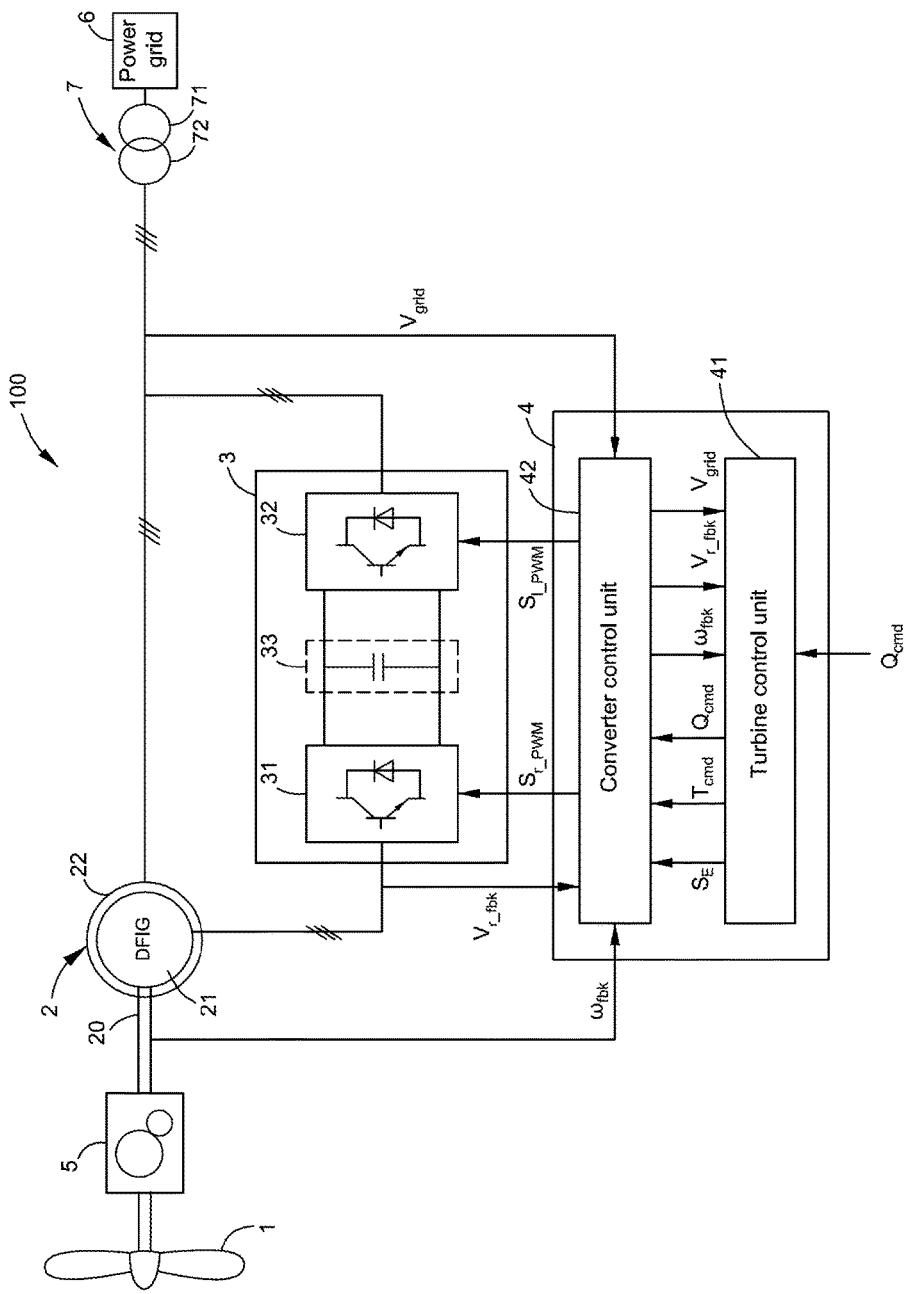
FIG. 2 is another schematic diagram of the exemplary wind generation system of FIG. 1.

FIG. 2 illustrates another schematic diagram of the wind generation system 100 of FIG. 1. As shown in FIG. 2, the controller 4 may comprise a turbine control unit 41 and a converter control unit 42. The turbine control unit 41 may receive a reactive power command $Q_{cmd}$ distributed to the wind turbine 1 from a wind farm. The converter control unit 42 may receive a measured rotation speed feedback $\omega_{fbk}$ from the rotor 21 of the DFIG 2, a measured rotor voltage feedback $V_{r\_fbk}$, and a grid voltage, for example a stator line-to-line voltage $V_{grid}$ from the power grid 6. The converter control unit 42 may communicate with the turbine control unit 41, and may pass the rotation speed feedback $\omega_{fbk}$, the rotor voltage feedback $V_{r\_fbk}$, and the grid voltage $V_{grid}$ to the turbine control unit 41.

Figure 3:
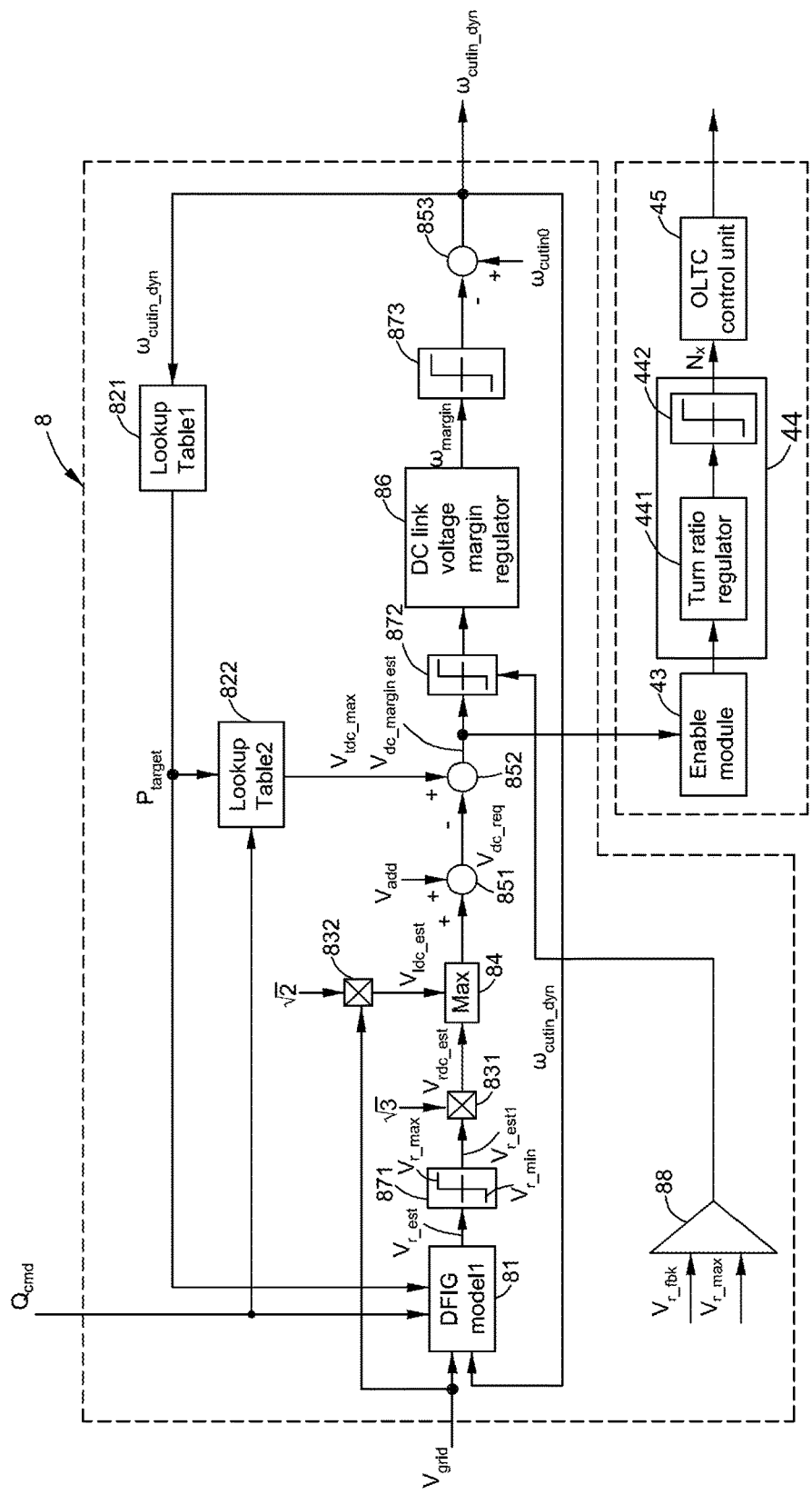
FIG. 3 is a schematic diagram of an exemplary rotation speed calculation module in accordance with an embodiment of the present disclosure.

With reference to both FIGS. 1 and 2 in combination with FIG. 3, the controller 4 may comprise a rotation speed calculation module 8 for calculating a dynamic cut-in rotation speed $\omega_{cutin\_dyn}$ of the rotor 21 of the DFIG 2. When the rotation speed feedback $\omega_{fbk}$ of the rotor 21 reaches the dynamic cut-in rotation speed $\omega_{cutin\_dyn}$ of the rotor 21, the turbine control unit 41 may send out a run request signal $S_E$ to the converter control unit 42. Furthermore, the turbine control unit 41 may generate a torque command $T_{cmd}$ of the DFIG 2 according to the rotation speed feedback $\omega_{fbk}$ of the rotor 21 and send the torque command $T_{cmd}$ and the reactive power command $Q_{cmd}$ to the converter control unit 42.

Hereinafter, how the rotation speed calculation module 8 calculates the dynamic cut-in rotation speed $\omega_{cutin\_dyn}$ of the rotor 21 will be described in detail with reference to FIG. 3.

FIG. 3 illustrates a schematic diagram of an exemplary rotation speed calculation module 8 in accordance with an embodiment of the present disclosure. The exemplary rotation speed calculation module 8 may include a first DFIG model 81. The first DFIG model 81 may receive a target active power $P_{target}$ of the DFIG 2 from a first lookup table 821, the reactive power command $Q_{cmd}$, the grid voltage $V_{grid}$ and a calculated dynamic cut-in rotation speed $\omega_{cutin\_dyn}$ of the rotor 21.

The first lookup table 821 may receive the calculated dynamic cut-in rotation speed $\omega_{cutin\_dyn}$ of the rotor 21 as an input and may output the target active power $P_{target}$. For example, in one embodiment, the first lookup table 821 may be established by using a curve of a torque of the DFIG 2 to a rotation speed of the rotor 21 and an equation as follows:

$$P_{target} = \omega_{cutin\_dyn} T_{target} \quad (1)$$

$T_{target}$ represents a target torque of the DFIG 2 which may be obtained from the curve of the torque of the DFIG 2 to the rotation speed of the rotor 21 according to the calculated dynamic cut-in rotation speed $\omega_{cutin\_dyn}$ of the rotor 21.

In the first DFIG model 81, a target slip ratio $s_{target}$ of the DFIG 2 may be calculated according to the following equation:

$$s_{target} = \frac{\omega_0 - \omega_{cutin\_dyn}}{\omega_0} \quad (2)$$

In this equation, $\omega_0$ represents a synchronous speed of the rotor 21. Thus, a stator power $P_s$ from a stator side may be obtained as follows:

$$P_s = \frac{P_{target}}{1 - s_{target}} \quad (3)$$

Figure 4:
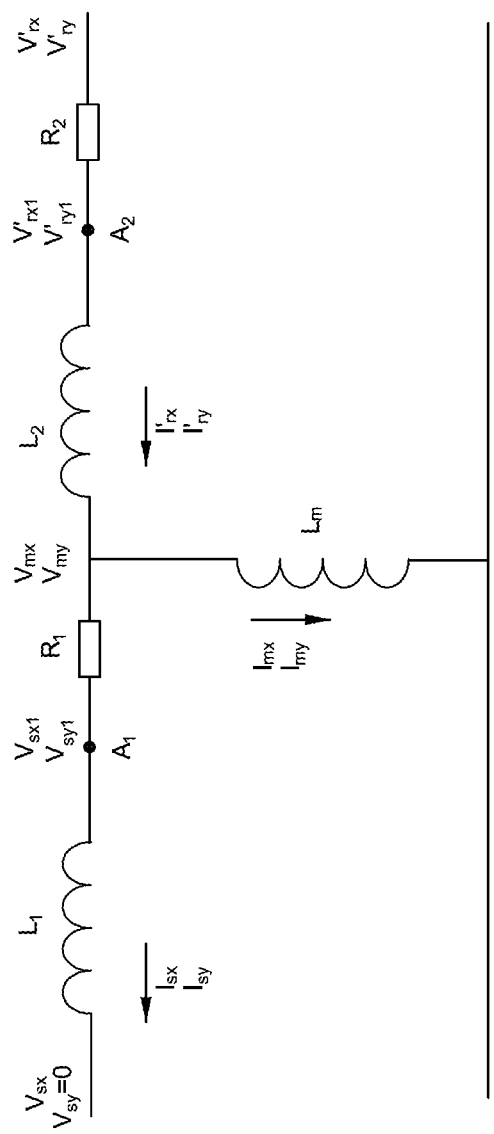
FIG. 4 is an equivalent circuit of an exemplary DFIG of FIG. 1.

FIG. 4 illustrates an exemplary equivalent circuit of the DFIG 2. The first DFIG model 81 may include some functional equations in the equivalent circuit of the DFIG 2. As shown in FIG. 4, these functional equations may be represented as follows:

$$V_{sx} = \sqrt{\frac{2}{3}} V_{grid} \quad (4)$$

$$V_{sy} = 0 \quad (5)$$

$$I_{sx} = \frac{2P_s}{3V_{sx}} \quad (6)$$

$$I_{sy} = -\frac{2Q_{cmd}}{3V_{sx}} \quad (7)$$

$$V_{sx1} = V_{sx} - \omega_0 L_1 I_{sy} \quad (8)$$

$$V_{sy1} = 0 + \omega_0 L_1 I_{sx} \quad (9)$$

$$V_{mx} = V_{sx1} + R_1 I_{sx} \quad (10)$$

$$V_{my} = V_{sy1} + R_1 I_{sy} \quad (11)$$

$$I_{mx} = \frac{V_{my}}{\omega_0 L_m} \quad (12)$$

$$I_{my} = -\frac{V_{mx}}{\omega_0 L_m} \quad (13)$$

$$I'_{rx} = I_{sx} + I_{mx} \quad (14)$$

$$I'_{ry} = I_{sy} + I_{my} \quad (15)$$

$$V'_{rx1} = V_{mx} - \omega_0 L_2 I'_{ry} \quad (16)$$

$$V'_{ry1} = V_{my} - \omega_0 L_2 I'_{rx} \quad (17)$$

$$V'_{rx} = V'_{rx1} + \frac{R_2 I'_{rx}}{s_{target}} \quad (18)$$

$$V'_{ry} = V'_{ry1} + \frac{R_2 I'_{ry}}{s_{target}} \quad (19)$$

$$V_{rx} = \frac{V'_{rx1} s_{target}}{N_{SR}} \quad (20)$$

$$V_{ry} = \frac{V'_{ry1} s_{target}}{N_{SR}} \quad (21)$$

$$V_{r\_est} = \sqrt{(V_{rx}^2 + V_{ry}^2)} \quad (22)$$

$V_{sx}$ and $V_{sy}$ respectively represent x and y components of stator voltage magnitudes, $I_{sx}$ and $I_{sy}$ respectively represent x and y components of stator currents, $V_{sx1}$ and $V_{sy1}$ respectively represent x and y components of voltage magnitudes at point $A_1$ of the equivalent circuit, $L_1$ represents an inductance at the stator side, $V_{mx}$ and $V_{my}$ respectively represent x and y components of voltage magnitudes in an excitation branch, $R_1$ represents a resistance at the stator side, $I_{mx}$ and $I_{my}$ respectively represent x and y components of currents in the excitation branch, $L_m$ represents an inductance in the excitation branch, $I'_{rx}$ and $I'_{ry}$ respectively represent x and y components of rotor currents, $V'_{rx1}$ and $V'_{ry1}$ respectively represent x and y components of voltage magnitudes at point $A_2$ of the equivalent circuit, $L_2$ represents an inductance at a rotor side, $V'_{rx}$ and $V'_{ry}$ respectively represent x and y components of voltage magnitudes referred to the stator side, $R_2$ represents a resistance at the rotor side, $V_{rx}$ and $V_{ry}$ respectively represent x and y components of rotor voltage magnitudes, $N_{SR}$ represents a turn ratio of the stator 22 to the rotor 21, and $V_{r\_est}$ represents a rotor voltage estimation. All these x and y components are under a synchronous frame.

In the equations above, the inductances $L_1$ and $L_2$ at the stator and the rotor sides, the resistances $R_1$ and $R_2$ at the stator and the rotor sides, the synchronous speed $\omega_0$ of the rotor 21, and the turn ratio $N_{SR}$ of the stator 22 to the rotor 21 are known. Thus, once the target active power $P_{target}$ of the DFIG 2, the reactive power command $Q_{cmd}$, the grid voltage $V_{grid}$ and the calculated dynamic cut-in rotation speed $\omega_{cutin\_dyn}$ of the rotor 21 are fed into the first DFIG model 81, the first DFIG model 81 may calculate the rotor voltage estimation $V_{r\_est}$ according to the equations (4)-(22) above.

Returning to FIG. 3, the exemplary rotation speed calculation module 8 may include a rotor voltage limiter 871. The rotor voltage limiter 871 may limit the calculated rotor voltage estimation $V_{r\_est}$ to a range of a rotor voltage maximum $V_{r\_max}$ and a rotor voltage minimum $V_{r\_min}$. The rotor voltage maximum $V_{r\_max}$ and the rotor voltage minimum $V_{r\_min}$ are setting values. A limited rotor voltage estimation $V_{r\_est1}$ may then be sent to a multiplier 831. The multiplier 831 may multiply the limited rotor voltage estimation $V_{r\_est1}$ by $\sqrt{3}$ to obtain a DC link voltage estimation $V_{rdc\_est}$ at the rotor side as follows:

$$V_{rdc\_est} = \sqrt{3} V_{r\_est1} \quad (23)$$

The grid voltage $V_{grid}$ may be sent to a multiplier 832. The multiplier 832 may multiply the grid voltage $V_{grid}$ by $\sqrt{2}$ to obtain a DC link voltage estimation $V_{ldc\_est}$ at a line side as follows:

$$V_{ldc\_est} = \sqrt{2} V_{grid} \quad (24)$$

The DC link voltage estimation $V_{rdc\_est}$ at the rotor side and the DC link voltage estimation $V_{ldc\_est}$ at the line side may be sent to a maximum selector (Max) 84. The maximum selector 84 may select a maximum from the DC link voltage estimation $V_{rdc\_est}$ at the rotor side and the DC link voltage estimation $V_{ldc\_est}$ at the line side. The maximum and a delta voltage $V_{add}$ for compensating additional voltage drop may further be sent to a summator 851. The summator 851 may sum the maximum and the delta voltage $V_{add}$ to obtain a DC link voltage requirement $V_{dc\_req}$ as follows:

$$V_{dc\_req} = \max(V_{rdc\_est}, V_{ldc\_est}) + V_{add} \quad (25)$$

The rotation speed calculation module 8 may include a second lookup table 822. The second lookup table 822 may comprise, for example, a three-dimensional (3D) table obtained from experiments to keep a sufficient safety margin. The second lookup table 822 may receive the target active power $P_{target}$ of the DFIG 2 as an input and the reactive power command $Q_{cmd}$ as an additional input, and may output a target DC link voltage maximum $V_{tdc\_max}$.

The DC link voltage requirement $V_{dc\_req}$ and the target DC link voltage maximum $V_{tdc\_max}$ may be sent to a subtractor 852. The subtractor 852 may subtract the DC link voltage requirement $V_{dc\_req}$ from the target DC link voltage maximum $V_{tdc\_max}$ so as to obtain a DC link voltage margin estimation $V_{dc\_margin\_est}$. The rotation speed calculation module 8 may include a comparator 88 and a dynamic limiter 872 connected with the comparator 88. The comparator 88 may compare the rotor voltage feedback $V_{r\_fbk}$ with the rotor voltage maximum $V_{r\_max}$. When the rotor voltage feedback $V_{r\_fbk}$ is greater than or equal to the rotor voltage maximum $V_{r\_max}$, output of the comparator 88 is 1. When the rotor voltage feedback $V_{r\_fbk}$ is less than the rotor voltage maximum $V_{r\_max}$, output of the comparator 88 is 0. If the output of the comparator 88 is 1, output of the dynamic limiter 872 may be clamped at zero. If the output of the comparator 88 is 0, the dynamic limiter 872 may send the DC link voltage margin estimation $V_{dc\_margin\_est}$ to a DC link voltage margin regulator 86. The DC link voltage margin regulator 86 may comprise for example, but is not limited to an I (Integral) regulator or a PI (Proportional-Integral) regulator. The DC link voltage margin regulator 86 may regulate the DC link voltage margin estimation $V_{dc\_margin\_est}$ to obtain a rotation speed margin $\omega_{margin}$ of the rotor 21. The rotation speed calculation module 8 may further include a limiter 873 for limiting the rotation speed margin $\omega_{margin}$ of the rotor 21 to a range of upper and lower limits.

The rotation speed margin $\omega_{margin}$ of the rotor 21 and an original cut-in rotation speed $\omega_{cutin0}$ of the rotor 21 may be sent to a subtractor 853. The original cut-in rotation speed $\omega_{cutin0}$ of the rotor 21 comprises a default lower threshold speed for generating power from the wind turbine 1. The subtractor 853 may subtract the rotation speed margin $\omega_{margin}$ of the rotor 21 from the original cut-in rotation speed $\omega_{cutin0}$ of the rotor 21 so as to obtain the dynamic cut-in rotation speed $\omega_{cutin\_dyn}$ of the rotor 21 on line.

Figure 5:
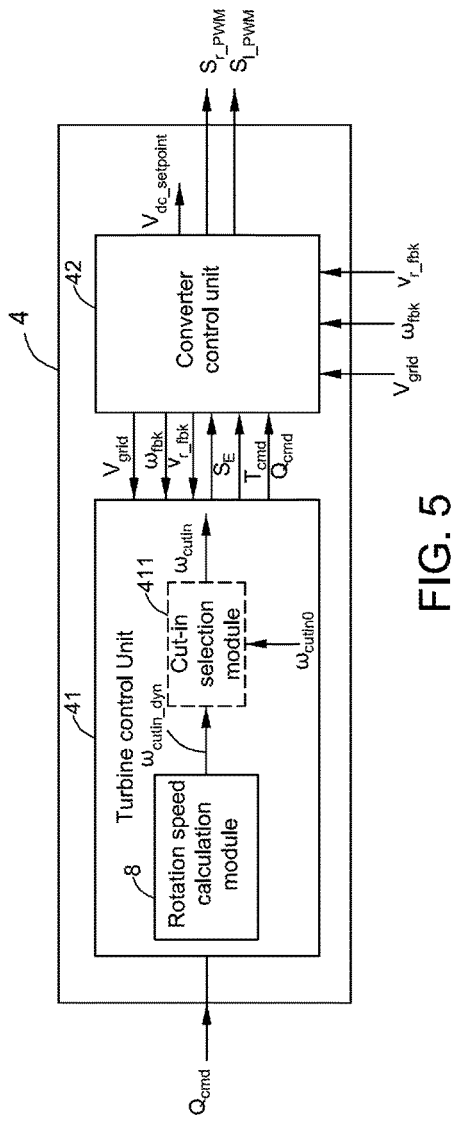
FIG. 5 is a schematic diagram of a turbine control unit and a converter control unit in accordance with an embodiment of the present disclosure.

With reference to FIG. 5, in one embodiment, the rotation speed calculation module 8 of the present disclosure may be arranged in the turbine control unit 41. The dynamic cut-in rotation speed $\omega_{cutin\_dyn}$ of the rotor 21, which may be calculated by the rotation speed calculation module 8 in the turbine control unit 41, may be directly saved in the turbine control unit 41. As an optional implementation, the turbine control unit 41 may further include a cut-in selection module 411. The cut-in selection module 411 may receive the dynamic cut-in rotation speed $\omega_{cutin\_dyn}$ of the rotor 21 and the original cut-in rotation speed $\omega_{cutin0}$ of the rotor 21, and select one from the dynamic cut-in rotation speed $\omega_{cutin\_dyn}$ of the rotor 21 and the original cut-in rotation speed $\omega_{cutin0}$ of the rotor 21 as a cut-in rotation speed $\omega_{cutin}$ of the rotor 21 according to custom's requirements. Thus, the dynamic cut-in rotation speed $\omega_{cutin\_dyn}$ of the rotor 21 of the present disclosure may be used as a value-added service for the custom to choose. Certainly, in the present disclosure, in order to lower the cut-in rotation speed $\omega_{cutin}$ of the rotor 21, the turbine control unit 41 would choose the dynamic cut-in rotation speed $\omega_{cutin\_dyn}$ of the rotor 21 as the cut-in rotation speed $\omega_{cutin}$ of the rotor 21 because the dynamic cut-in rotation speed $\omega_{cutin\_dyn}$ of the rotor 21 is less than the original cut-in rotation speed $\omega_{cutin0}$ of the rotor 21. In the embodiment wherein the rotation speed calculation module 8 is included in the turbine control unit 41, there is no new data needed in the communication between the turbine control unit 41 and the converter control unit 42.

Figure 6:
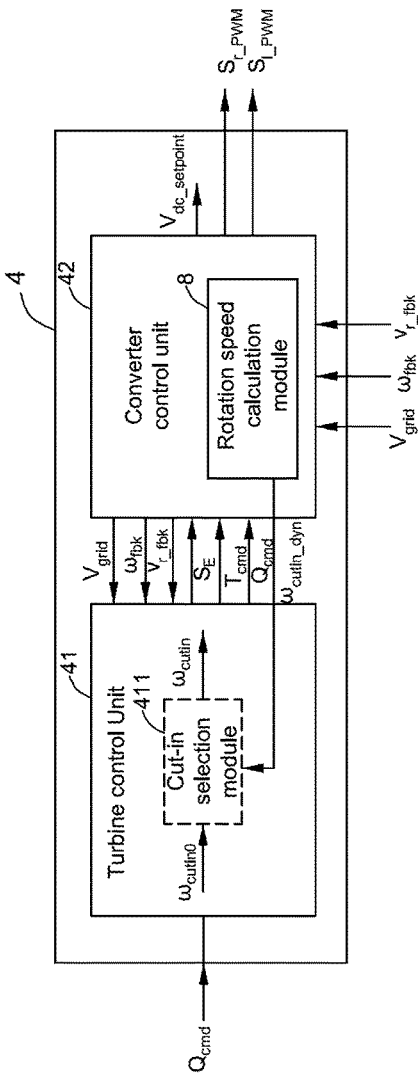
FIG. 6 is a schematic diagram of a turbine control unit and a converter control unit in accordance with another embodiment of the present disclosure.

With reference to FIG. 6, in another embodiment, the rotation speed calculation module 8 of the present disclosure may also be arranged in the converter control unit 42. The dynamic cut-in rotation speed $\omega_{cutin\_dyn}$ of the rotor 21, which may be calculated by the rotation speed calculation module 8 in the converter control unit 42, needs to be fed back to the turbine control unit 41. Thus, under such circumstance, a new signal, i.e. the dynamic cut-in rotation speed $\omega_{cutin\_dyn}$ of the rotor 21 needs to be added from the converter control unit 42 to the turbine control unit 41.

Referring to FIG. 2 in combination with FIGS. 5 and 6, the converter control unit 42 may follow the run request signal $S_E$, the torque command $T_{cmd}$ and the reactive power command $Q_{cmd}$, and may determine a DC link voltage margin $V_{dc\_margin}$ of the converter 3. Then, the converter control unit 42 may further determine a DC link voltage setpoint $V_{dc\_setpoint}$ of the converter 3 based on the determined DC link voltage margin $V_{dc\_margin}$, and control the converter 3 based on the determined DC link voltage setpoint $V_{dc\_setpoint}$ so as to lower the cut-in rotation speed $\omega_{cutin}$ of the rotor 21.

Hereinafter, how the converter control unit 42 determines the DC link voltage margin $V_{dc\_margin}$ and the DC link voltage setpoint $V_{dc\_setpoint}$ of the converter 3 will be described in detail with reference to FIG. 7.

Figure 7:
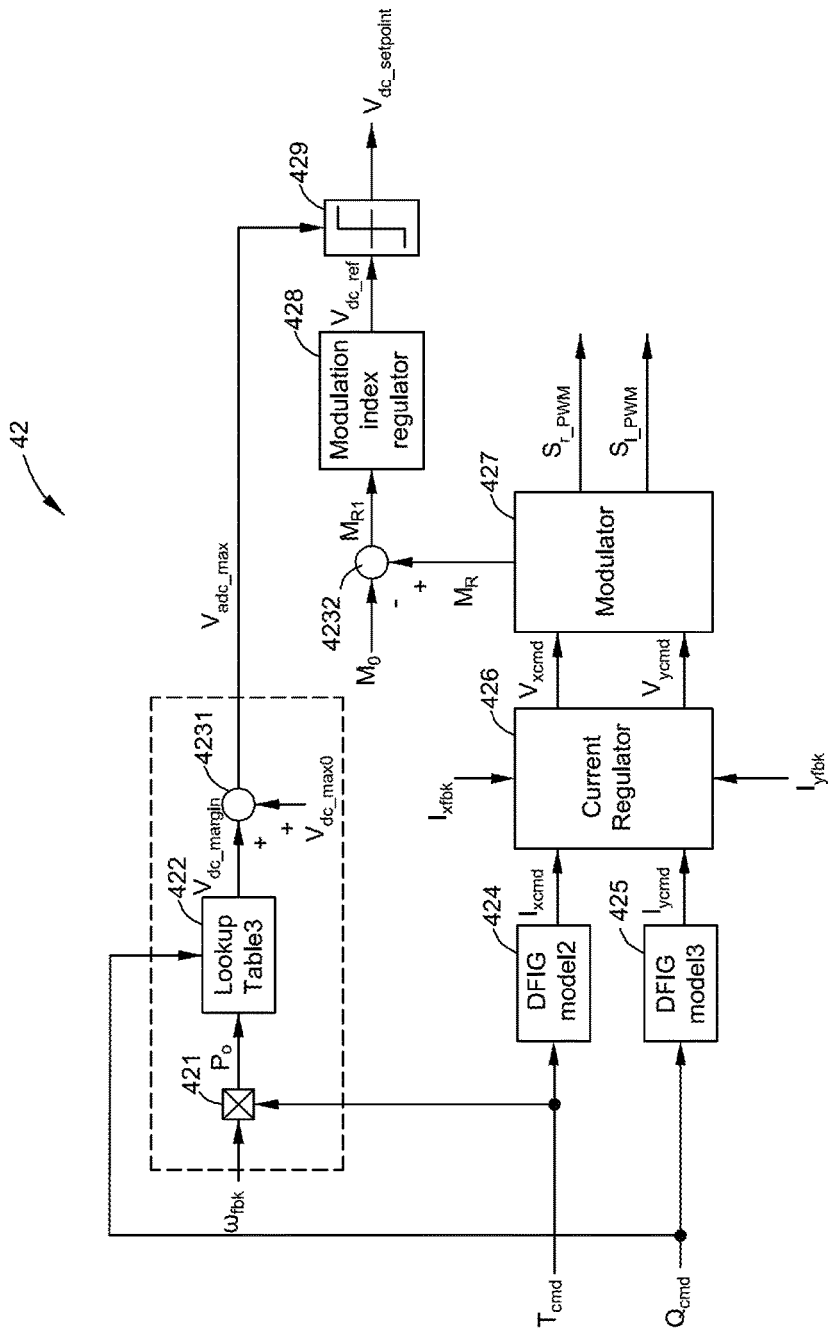
FIG. 7 is a schematic diagram of an exemplary converter control unit in accordance with an embodiment of the present disclosure.

FIG. 7 illustrates a schematic diagram of the exemplary converter control unit 42 in accordance with an embodiment of the present disclosure. The converter control unit 42 may include a multiplier 421, a third lookup table 422 and a summator 4231. The rotation speed feedback $\omega_{fbk}$ from the rotor 21 of the DFIG 2 and the torque command $T_{cmd}$ from the turbine control unit 41 may be sent to the multiplier 421 so as to obtain an output active power $P_o$ of the DFIG 2 as follows:

$$P_o = \omega_{fbk} T_{cmd} \qquad (26)$$

The third lookup table 422 may comprise, for example, a three-dimensional (3D) table obtained from experiments to maintain a sufficient safety margin. The third lookup table 422 may receive the output active power $P_o$ of the DFIG 2 as an input and the reactive power command $Q_{cmd}$ as an additional input, and may output the DC link voltage margin $V_{dc\_margin}$ of the converter 3.

Then, the DC link voltage margin $V_{dc\_margin}$ of the converter 3 and an original DC link voltage maximum $V_{dc\_max0}$ of the converter 3 at the original cut-in rotation speed $\omega_{cutin0}$ of the rotor 21 may be sent to the summator 4231. The summator 4231 may add the determined DC link voltage margin $V_{dc\_margin}$ of the converter 3 to the original DC link voltage maximum $V_{dc\_max0}$ of the converter 3 so as to generate an added DC link voltage maximum $V_{adc\_max}$.

With continued reference to FIG. 7, the converter control unit 42 may include a second DFIG model 424 and a third DFIG model 425. The second DFIG model 424 may receive the torque command $T_{cmd}$ from the turbine control unit 41 and generate a rotor active current command $I_{xcmd}$. The third DFIG model 425 may receive the reactive power command $Q_{cmd}$ and generate a rotor reactive current command $I_{ycmd}$. The converter control unit 42 may further include a current regulator 426 and a modulator 427. The current regulator 426 may receive the rotor active current command $I_{xcmd}$, the rotor reactive current command $I_{ycmd}$, a measured rotor active current feedback $I_{xfbk}$ and a measured rotor reactive current feedback $I_{yfbk}$, and generate a rotor active voltage command $V_{xcmd}$ and a rotor reactive voltage command $V_{ycmd}$. The modulator 427 may receive the rotor active voltage command $V_{xcmd}$ and the rotor reactive voltage command $V_{ycmd}$, and generate a rotor side modulation index $M_R$ and rotor-side and line-side pulse width modulation (PWM) signals $S_{r\_PWM}$, $S_{1\_PWM}$. The rotor-side and line-side pulse width modulation signals $S_{r\_PWM}$, $S_{1\_PWM}$ may be respectively sent to the rotor-side converter 31 and the line-side converter 32.

The converter control unit 42 may further include a subtractor 4232, a modulation index regulator 428 and a limiter 429. The rotor side modulation index $M_R$ and a modulation index setpoint $M_0$ (for example, 0.98) may be sent to the subtractor 4232. The subtractor 4232 may subtract the modulation index setpoint $M_0$ from the rotor side modulation index $M_R$ so as to obtain a subtracted rotor side modulation index $M_{R1}$. The subtracted rotor side modulation index $M_{R1}$ may be sent to the modulation index regulator 428. The modulation index regulator 428 may regulate the subtracted rotor side modulation index $M_{R1}$ to generate a DC link voltage reference $V_{dc\_ref}$. The DC link voltage reference $V_{dc\_ref}$ and the added DC link voltage maximum $V_{adc\_max}$ may be sent to the limiter 429 so as to generate the DC link voltage setpoint $V_{dc\_setpoint}$ of the converter 3. The generated DC link voltage setpoint $V_{dc\_setpoint}$ may be sent to a line-side converter control unit (not shown) of the converter control unit 42 for controlling the converter 3 so as to increase the DC link voltage of the converter 3.

By increasing the DC link voltage of the converter 3, the wind generation system 100 of the present disclosure may extend a voltage range of the converter 3, thereby lowering the cut-in rotation speed $\omega_{cutin}$ of the rotor 21 of the DFIG 2 to capture more wind power in low wind speed conditions. The benefits of this cut-in extension are not only about early start-up of the wind turbine 1. Actually, increase of AEP (annual electricity production) is pretty small. But also more importantly, it could reduce the deadband of between stop and re-cutin of the wind turbine 1 due to the fact of high turbulence in low wind speed. That is, loss of AEP could be reduced.

In the embodiments wherein the on-load tap-changing transformer 7 is included, the wind generation system 100 of the present disclosure may also lower the cut-in rotation speed $\omega_{cutin}$ of the rotor 21 of the DFIG 2 by changing the turn ratio of the on-load tap-changing transformer 7.

Returning to FIG. 3, in the wind generation system 100 of the present disclosure, the controller 4 may further comprise an enable module 43, a turn ratio calculation unit 44 and an on-load tap-changing (OLTC) control unit 45. The DC link voltage margin estimation $V_{dc\_margin\_est}$ of the converter 3 may be sent to the enable module 43. When the DC link voltage requirement $V_{dc\_req}$ is approaching the target DC link voltage maximum $V_{tdc\_max}$, that is, when the DC link voltage margin estimation $V_{dc\_margin\_est}$ is less than a predetermined value, for example 10 Volts, output of the enable module 43 may become 1. Otherwise, output of the enable module 43 may be clamped to zero. The turn ratio calculation unit 44 may include a turn ratio regulator 441 and a limiter 442. The turn ratio regulator 441 may be a PI or an I regulator. When output of the enable module is 1, the turn ratio calculation unit 44 may calculate a target turn ratio $N_X$ of the on-load tap-changing transformer 7 with the turn ratio regulator 441 and limit function of the limiter 442. The target turn ratio $N_X$ of the on-load tap-changing transformer 7 may be sent to the OLTC control unit 45, and the OLTC control unit 45 may control the on-load tap-changing transformer 7 according to the target turn ratio $N_X$.

After the wind turbine 1 starts and wind speed increases, output of the enable module 43 may be clamped to zero, that is, the turn ratio calculation channel could be disabled, and the OLTC control unit 45 will restore its normal control.

By increasing the turn ratio of the on-load tap-changing transformer 7, the wind generation system 100 of the present disclosure may reduce the grid voltage $V_{grid}$, thereby also lowering the cut-in rotation speed $\omega_{cutin}$ of the rotor 21 of the DFIG 2 to capture more wind power in low wind speed conditions and reduce the deadband of between stop and re-cutin of the wind turbine 1 due to the fact of high turbulence in low wind speed.

In another embodiment of the wind generation system 100 of the present disclosure, the turn ratio changing embodiment may also be combined with the DC link voltage setpoint embodiment. In such the embodiment, after the OLTC control unit 45 increases the turn ratio of the on-load tap-changing transformer 7 according to the target turn ratio $N_X$, the grid voltage $V_{grid}$ may be reduced. A new rotation speed margin of the rotor 21 may be determined again based on the reduced grid voltage by using the above-mentioned method so as to determine a new dynamic cut-in rotation speed of the rotor 21. When a new rotation speed feedback of the rotor 21 reaches the new dynamic cut-in rotation speed of the rotor 21, the turbine control unit 41 may send out a run request signal to the converter control unit 42, and may generate a new torque command of the DFIG 2 according to the new rotation speed feedback. Similarly, the converter control unit 42 may determine a new DC link voltage margin based on the new rotation speed feedback of the rotor 21 and the new torque command and may thus determine a new DC link voltage setpoint of the converter 3. Therefore, by increasing the DC link voltage of the converter 3 and increasing the turn ratio of the on-load tap-changing transformer 7, the wind generation system 100 of the present disclosure may lower the cut-in rotation speed $\omega_{cutin}$ of the rotor 21 of the DFIG 2 so as to capture more wind power in low wind speed conditions and reduce loss of AEP.

Figure 8:
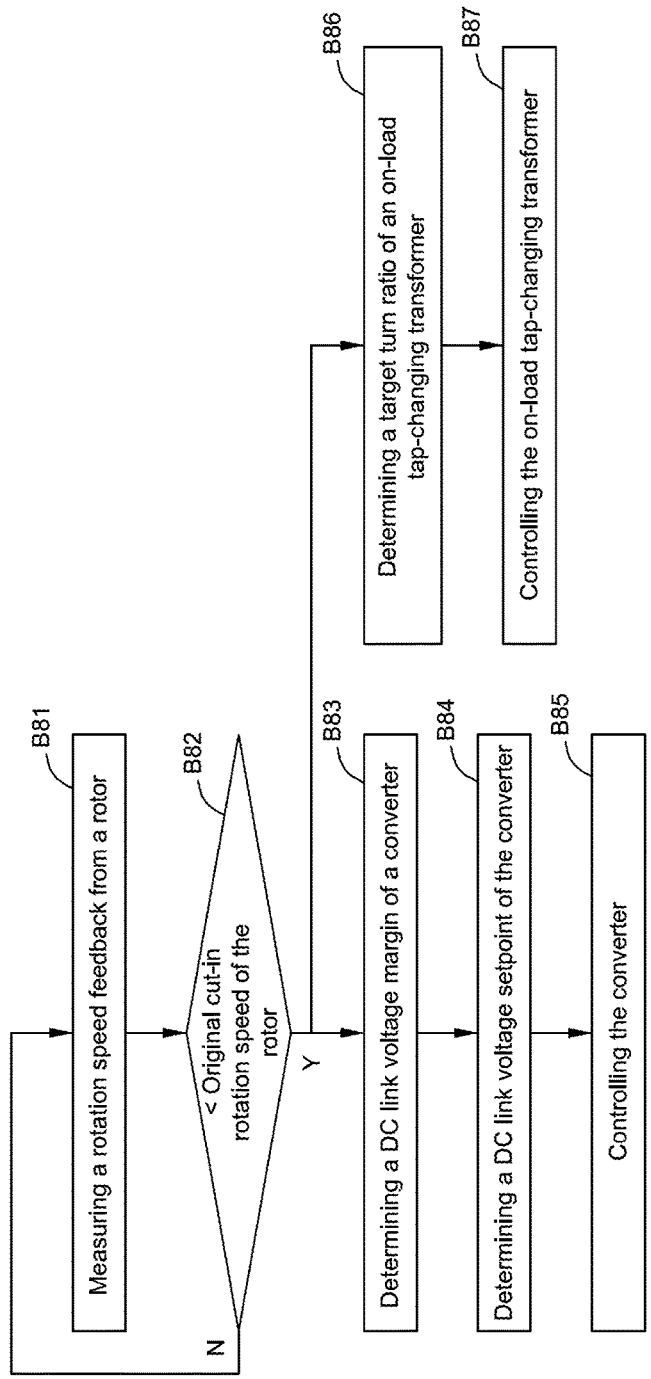
FIG. 8 is a flow chart of an exemplary method for controlling a wind generation system in accordance with an embodiment of the present disclosure.

The present disclosure may further provide a method for controlling the wind generation system 100. FIG. 8 illustrates a flow chart of an exemplary method for controlling the wind generation system 100 in accordance with an embodiment of the present disclosure.

As shown in FIG. 8, in block B81, a rotation speed feedback $\omega_{fbk}$ from the rotor 21 of the DFIG 2 may be measured, for example, by using a sensor.

In block B82, it may be determined whether the rotation speed feedback $\omega_{fbk}$ of the rotor 21 is lower than an original cut-in rotation speed $\omega_{cutin0}$ of the rotor 21. When the rotation speed feedback $\omega_{fbk}$ of the rotor 21 is lower than the original rotation speed $\omega_{cutin0}$ of the rotor 21, the process may go to block B83. If not, the process may return to block B81.

In block B83, a DC link voltage margin $V_{dc\_margin}$ of the converter 3 may be determined.

A dynamic cut-in rotation speed $\omega_{cutin\_dyn}$ of the rotor 21 may be first calculated. When the rotation speed feedback $\omega_{fbk}$ of the rotor 21 reaches the dynamic cut-in rotation speed $\omega_{cutin\_dyn}$ of the rotor 21, a torque command $T_{cmd}$ of the DFIG 2 may be generated according to the rotation speed feedback $\omega_{fbk}$. Then, an output active power $P_o$ of the DFIG 2 may be calculated based on the rotation speed feedback $\omega_{fbk}$ of the rotor 21 and the torque command $T_{cmd}$. The DC link voltage margin $V_{dc\_margin}$ of the converter 3 may be determined from a third lookup table 422 for example, by using the calculated output active power $P_o$ of the DFIG 2 and the reactive power command $Q_{cmd}$.

Figure 9:
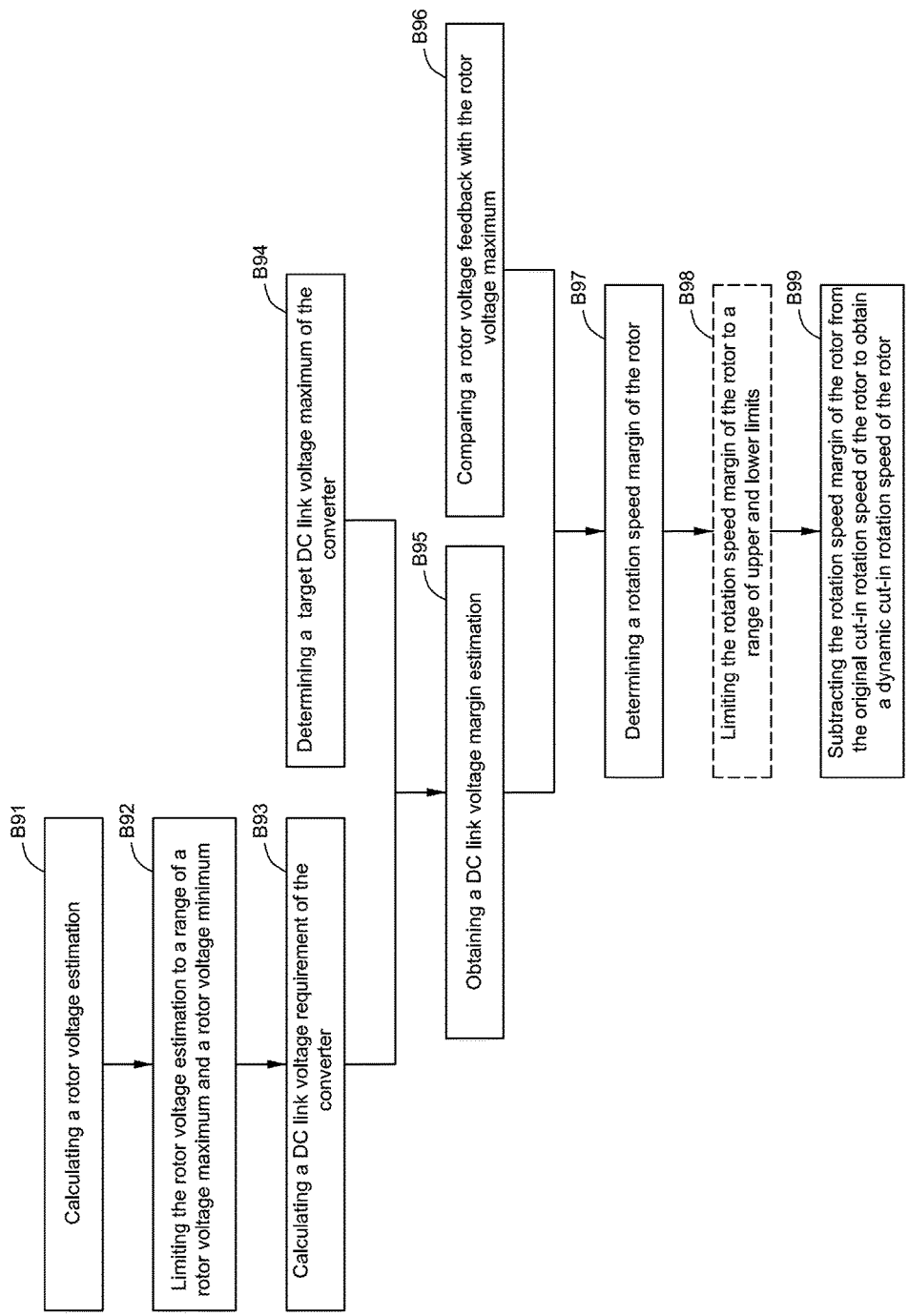
FIG. 9 illustrates the steps of how to calculate a dynamic cut-in rotation speed of a rotor of the DFIG of FIG. 1.

FIG. 9 illustrates the steps of how to calculate the dynamic cut-in rotation speed $\omega_{cutin\_dyn}$ of the rotor 21. In block B91 of FIG. 9, a rotor voltage estimation $V_{r\_est}$ may be calculated based on a calculated dynamic cut-in rotation speed $\omega_{cutin\_dyn}$ of the rotor 21, a grid voltage $V_{grid}$ from the power grid 6, a reactive power command $Q_{cmd}$ distributed to the wind turbine 1, and a target active power $P_{target}$ of the DFIG 2 from a first lookup table 821 using the calculated dynamic cut-in rotation speed $\omega_{cutin\_dyn}$ of the rotor 21.

In block B92, the calculated rotor voltage estimation $V_{r\_est}$ may be limited to a range of a rotor voltage maximum $V_{r\_max}$ and a rotor voltage minimum $V_{r\_min}$.

In block B93, a DC link voltage requirement $V_{dc\_req}$ of the converter 3 may be calculated based on the limited rotor voltage estimation $V_{r\_est1}$.

In block B94, a target DC link voltage maximum $V_{tdc\_max}$ of the converter 3 may be determined from a second lookup table 822 for example, according to the reactive power command $Q_{cmd}$ and the target active power $P_{target}$.

In block B95, a DC link voltage margin estimation $V_{dc\_margin\_est}$ may be obtained by subtracting the DC link voltage requirement $V_{dc\_req}$ from the target DC link voltage maximum $V_{tdc\_max}$.

In block B96, a rotor voltage feedback $V_{r\_fbk}$ is compared with the rotor voltage maximum $V_{r\_max}$.

In block B97, a rotation speed margin $\omega_{margin}$ of the rotor 21 may be determined.

The DC link voltage margin estimation $V_{dc\_margin\_est}$ in block B95 and the comparative result in block B96 may be sent to a dynamic limiter 872. The dynamic limiter 872 may limit the DC link voltage margin estimation $V_{dc\_margin\_est}$ based on the comparative result. When the rotor voltage feedback $V_{r\_fbk}$ is greater than or equal to the rotor voltage maximum $V_{r\_max}$, the comparative result is 1. When the rotor voltage feedback $V_{r\_fbk}$ is less than the rotor voltage maximum $V_{r\_max}$, the comparative result is 0. If the comparative result is 1, output of the dynamic limiter 872 may be clamped at zero. If the comparative result is 0, the dynamic limiter 872 may output the DC link voltage margin estimation $V_{dc\_margin\_est}$. Then, the rotation speed margin $\omega_{margin}$ of the rotor 21 may be determined based on output of the dynamic limiter 872.

In an optional block B98, the rotation speed margin $\omega_{margin}$ of the rotor 21 may be limited to a range of upper and lower limits.

In block B99, the rotation speed margin $\omega_{margin}$ of the rotor 21 may be subtracted from the original cut-in rotation speed $\omega_{cutin0}$ of the rotor 21 so as to obtain the dynamic cut-in rotation speed $\omega_{cutin\_dyn}$ of the rotor 21.

Returning to FIG. 8, in block B84, a DC link voltage setpoint $V_{dc\_setpoint}$ of the converter 3 may be determined based on the determined DC link voltage margin $V_{dc\_margin}$. The determined DC link voltage margin $V_{dc\_margin}$ may be added to an original DC link voltage maximum $V_{dc\_max0}$ of the converter 3 at the original cut-in rotation speed $\omega_{cutin0}$ of the rotor 21 to generate an added DC link voltage maximum $V_{adc\_max}$. The DC link voltage setpoint $V_{dc\_setpoint}$ of the converter 3 may be determined based on the added DC link voltage maximum $V_{adc\_max}$, a rotor side modulation index $M_R$ and a modulation index setpoint $M_0$.

In block B85, the converter 3 may be controlled based on the determined DC link voltage setpoint $V_{dc\_setpoint}$ so as to lower the cut-in rotation speed $\omega_{cutin}$ of the rotor 21.

In the method of the present disclosure, in embodiments wherein the transformer 7 comprises an on-load tap-changing transformer, when the rotation speed feedback $\omega_{fbk}$ of the rotor 21 is lower than the original cut-in rotation speed $\omega_{cutin0}$ of the rotor 21, the process may alternatively go to block B86.

In block B86, a target turn ratio $N_X$ of the on-load tap-changing transformer 7 may be determined.

In block B87, the on-load tap-changing transformer 7 may be controlled based on the target turn ratio $N_X$ of the on-load tap-changing transformer 7 so as to lower the cut-in rotation speed $\omega_{cutin}$ of the rotor 21.

In the method of the present disclosure, changing the turn ratio may also be combined with determining DC link voltage setpoint. Under this circumstance, after the turn ratio of the on-load tap-changing transformer 7 is increased in block B87, the process may continue to block B83. In block B83, a new rotation speed margin of the rotor 21 may be determined again based on a reduced grid voltage so as to determine a new dynamic cut-in rotation speed of the rotor 21. When a new rotation speed feedback of the rotor 21 reaches the new dynamic cut-in rotation speed of the rotor 21, a new torque command of the DFIG 2 may be generated according to the new rotation speed feedback. Thus, a new DC link voltage margin of the converter 3 may be determined based on the new rotation speed feedback of the rotor 21 and the new torque command. Then, in block B84, a new DC link voltage setpoint of the converter 3 may be determined.

The method for controlling the wind generation system 100 of the present disclosure may extend a voltage range of the converter 3 by increasing the DC link voltage of the converter 3 and/or reduce the grid voltage $V_{grid}$ by increasing the turn ratio of the on-load tap-changing transformer 7, thereby lowering the cut-in rotation speed $\omega_{cutin}$ of the rotor 21 of the DFIG 2 to capture more wind power and reduce the deadband of between stop and re-cutin of the wind turbine 1 due to the fact of high turbulence in low wind speed conditions.

While actions of the methods for controlling the wind generation system 100 in accordance with embodiments of the present disclosure are illustrated as functional blocks, the order of the blocks and the separation of the actions among the various blocks shown in FIGS. 8-9 are not intended to be limiting. For example, the blocks may be performed in a different order and an action associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A method for controlling a wind generation system, wherein the wind generation system comprises a wind turbine for generating mechanical power, a doubly-fed induction generator for converting the mechanical power to electrical power, and a converter for converting the electrical power to a desired electrical power for supplying to a power grid, the method comprising:
    determining a DC link voltage margin of the converter when a measured rotation speed feedback from a rotor of the generator is lower than an original cut-in rotation speed of the rotor;
    determining a DC link voltage setpoint of the converter based on the determined DC link voltage margin; and
    controlling the converter based on the determined DC link voltage setpoint so as to lower the original cut-in rotation speed of the rotor.

2. The method of claim 1, further comprising:
    calculating a new cut-in rotation speed of the rotor, which is lower than the original cut-in rotation speed of the rotor;
    generating a torque command of the generator according to the rotation speed feedback when the rotation speed feedback reaches the new cut-in rotation speed of the rotor; and
    determining the DC link voltage margin based on the rotation speed feedback of the rotor and the torque command.

3. The method of claim 2, wherein calculating the new cut-in rotation speed of the rotor comprises:
  determining a rotation speed margin of the rotor; and
  subtracting the rotation speed margin of the rotor from the original cut-in rotation speed of the rotor to obtain the new cut-in rotation speed of the rotor.

4. The method of claim 3, wherein determining the rotation speed margin of the rotor comprises:
  calculating a rotor voltage estimation based on a calculated new cut-in rotation speed of the rotor, a grid voltage from the power grid, a reactive power command distributed to the wind turbine, and a target active power of the generator from a first lookup table according to the calculated new cut-in rotation speed of the rotor;
  limiting the calculated rotor voltage estimation to a range of a rotor voltage maximum and a rotor voltage minimum;
  calculating a DC link voltage requirement of the converter based on a limited rotor voltage estimation;
  determining a target DC link voltage maximum of the converter from a second lookup table according to the reactive power command and the target active power; and
  obtaining the rotation speed margin of the rotor based on the calculated DC link voltage requirement and the determined target DC link voltage maximum.

5. The method of claim 4, wherein obtaining the rotation speed margin of the rotor comprises:
  subtracting the DC link voltage requirement from the target DC link voltage maximum to obtain a DC link voltage margin estimation;
  comparing a rotor voltage feedback with the rotor voltage maximum;
  limiting the DC link voltage margin estimation based on a comparative result; and
  obtaining the rotation speed margin of the rotor based on a limited DC link voltage margin estimation.

6. The method of claim 2, further comprising:
  calculating an output active power of the generator based on the rotation speed feedback of the rotor and the torque command; and
  using the calculated output active power of the generator and a reactive power command distributed to the wind turbine from a lookup table to determine the DC link voltage margin.

7. The method of claim 1, wherein determining the DC link voltage setpoint of the converter comprises:
  adding the determined DC link voltage margin to an original DC link voltage maximum of the converter at the original cut-in rotation speed of the rotor to generate an added DC link voltage maximum; and
  determining the DC link voltage setpoint of the converter based on the added DC link voltage maximum, a rotor side modulation index and a modulation index setpoint.

8. A wind generation system comprising:
  a wind turbine for generating mechanical power;
  a doubly-fed induction generator for converting the mechanical power to electrical power;
  a converter for converting the electrical power to a desired electrical power for supplying to a power grid, and
  a controller for determining a DC link voltage margin of the converter when a measured rotation speed feedback from a rotor of the generator is lower than an original cut-in rotation speed of the rotor, determining a DC link voltage setpoint of the converter based on the determined DC link voltage margin, and controlling the converter based on the determined DC link voltage setpoint so as to lower the original cut-in rotation speed of the rotor.

9. The wind generation system of claim 8, wherein the controller comprises:
  a rotation speed calculation module for calculating a new cut-in rotation speed of the rotor, which is lower than the original cut-in rotation speed of the rotor;
  a turbine control unit for sending out a run request signal to a converter control unit when the rotation speed feedback reaches the new cut-in rotation speed of the rotor and generating a torque command of the generator according to the rotation speed feedback; and
  the converter control unit for determining the DC link voltage margin based on the rotation speed feedback of the rotor and the torque command.

10. The wind generation system of claim 9, wherein the rotation speed calculation module is configured for determining a rotation speed margin of the rotor, and subtracting the rotation speed margin of the rotor from the original cut-in rotation speed of the rotor to obtain the new cut-in rotation speed of the rotor.

11. The wind generation system of claim 10, wherein the rotation speed calculation module is configured for:
  calculating a rotor voltage estimation based on a calculated new cut-in rotation speed of the rotor, a grid voltage from the power grid, a reactive power command distributed to the wind turbine, and a target active power of the generator from a first lookup table according to the calculated new cut-in rotation speed of the rotor;
  limiting the calculated rotor voltage estimation to a range of a rotor voltage maximum and a rotor voltage minimum;
  calculating a DC link voltage requirement of the converter based on a limited rotor voltage estimation;
  determining a target DC link voltage maximum of the converter from a second lookup table according to the reactive power command and the target active power; and
  obtaining the rotation speed margin of the rotor based on the calculated DC link voltage requirement and the determined target DC link voltage maximum.

12. The wind generation system of claim 11, wherein the rotation speed calculation module is configured for:
  subtracting the DC link voltage requirement from the target DC link voltage maximum to obtain a DC link voltage margin estimation;
  comparing a rotor voltage feedback with the rotor voltage maximum;
  limiting the DC link voltage margin estimation based on a comparative result; and
  obtaining the rotation speed margin of the rotor based on a limited DC link voltage margin estimation.

13. The wind generation system of claim 9, wherein the rotation speed calculation module is arranged in the turbine control unit; or
  the rotation speed calculation module is arranged in the converter control unit and the converter control unit sends the new cut-in rotation speed of the rotor back to the turbine control unit.

14. The wind generation system of claim 9, wherein the converter control unit is configured for calculating an output active power of the generator based on the rotation speed feedback of the rotor and the torque command, and using the calculated output active power of the generator and a reactive power command distributed to the wind turbine from a lookup table to determine the DC link voltage margin.

15. The wind generation system of claim 9, wherein the converter control unit is configured for adding the determined DC link voltage margin to an original DC link voltage maximum at the original cut-in rotation speed of the rotor to generate an added DC link voltage maximum, and determining the DC link voltage setpoint of the converter based the added DC link voltage maximum, a rotor side modulation index and a modulation index setpoint.

16. The wind generation system of claim 8, further comprising an on-load tap-changing transformer through which a stator of the generator is coupled to the power grid, wherein the cut-in rotation speed of the rotor is lowered by increasing a turn ratio of the on-load tap-changing transformer, and the turn ratio of the on-load tap-changing transformer is defined as a turn ratio of a primary winding to a secondary winding of the transformer.

* * * * *